United States Patent [19]
Montgomery

[11] 3,724,996
[45] Apr. 3, 1973

[54] BORON NITRIDE CONTAINING VESSEL HAVING A SURFACE COATING OF ZIRCONIUM SILICON

[75] Inventor: Lionel C. Montgomery, North Olmsted, Ohio

[73] Assignee: Union Carbide Corporation, New York, N.Y.

[22] Filed: Mar. 12, 1971

[21] Appl. No.: 123,552

[52] U.S. Cl. ......................432/264, 75/177, 432/265
[51] Int. Cl. ..........................F27d 5/00, F27b 21/04
[58] Field of Search ....................263/47, 48; 75/177

[56] References Cited

UNITED STATES PATENTS 3,216,710  11/1965  Lenihan, Jr. et al.....................263/48

Primary Examiner—John J. Camby
Attorney—Paul A. Rose, Harrier M. Humphreys, Robert C. Cummings and Cornelius F. O'Brien

[57] ABSTRACT

A boron nitride containing vessel having at least a portion of its surface coated with a zirconium silicon base alloy so as to render such surface readily wettable by molten metals such as aluminum.

10 Claims, 1 Drawing Figure

PATENTED APR 3 1973
3,724,996
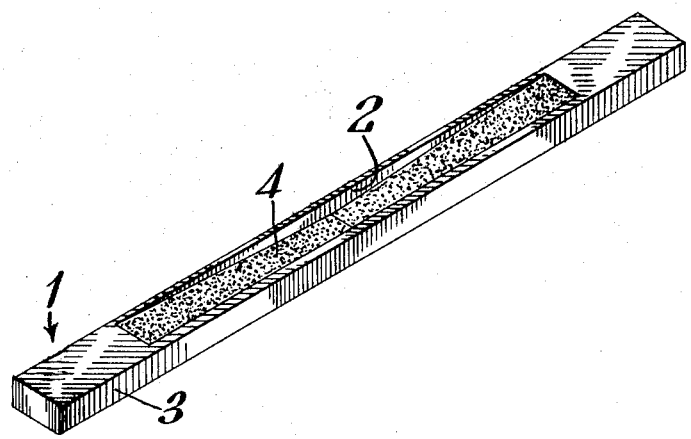
INVENTOR
LIONEL C. MONTGOMERY
BY
ATTORNEY

BORON NITRIDE CONTAINING VESSEL HAVING A SURFACE COATING OF ZIRCONIUM SILICON

FIELD OF THE INVENTION

The present invention invention relates to a boron nitride containing vessel having deposited on its surface a zirconium silicon base coating which is readily wetted by molten metals, such as molten aluminum and the like. The coating can be applied by reacting a portion of the zirconium silicon base alloy with the contacted boron nitride containing vessel at elevated temperatures.

DESCRIPTION OF THE PRIOR ART

The coating or metallizing of an article by vapor deposition is carried out in a vacuum chamber which contains both the metal to be vaporized and, in a spaced apart relationship, the article to be coated or metallized. Generally, the metal to be vaporized is held or placed in a refractory vessel such as a crucible, and heated therein to a temperature sufficient to cause it to become molten and commence to vaporize.

It is common practice in this vapor deposition art to employ vessels which are easily wetted by the metallizing material. The necessary characteristics of such vessels are that they do not react with the material being deposited, can withstand the high temperature environment associated with vapor deposition, and provide a surface that is readily wettable by the metallizing material so as to facilitate maximum deposition in a minimum time.

Boron nitride vessels have been employed as vaporization vessels (also known as vaporization boats), with some success. In the vapor disposition of aluminum on various articles composed from such diverse materials as steel, rubber, plastic and the like, the aluminum is slow in wetting the evaporization surface of the boron nitride boat thus resulting in a low evaporization rate. This delay in wetting reduces the total efficiency of the metallizing process and adds to the overall cost of applying the coating.

An improved vaporization vessel is disclosed in my copending U.S. Pat. application Ser. No. 742,446, filed on July 3, 1968, now abandoned, which describes a boron nitride containing vessel having a titanium silicon base alloy coating which is admirably suited for the vapor disposition of aluminum.

The present invention is directed to a zirconium silicon base alloy coating for boron nitride containing vessels which provides a surface readily wetted by molten metals, such as aluminum, silver, gold and the like, thus rendering it suitable for vapor deposition applications.

SUMMARY OF THE INVENTION

Broadly stated, the invention relates to a boron nitride containing vessel having at least a portion of its surface coated with a zirconium silicon base alloy which renders the surface readily wetted by molten metals, such as aluminum, silver, gold, and the like. This coated surface of the vessel is admirably suited for use in vapor deposition applications for the metalization of various materials.

The zirconium silicon alloy can be bonded to at least a portion of the surface of a vessel by depositing the alloy onto the surface using any conventional technique and then subjected the coated vessel to a temperature sufficient to cause a portion of the zirconium silicon alloy to diffuse into the boron nitride containing body and react with the contacted boron nitride therein to form $ZrB_2$ and $ZrN$, while leaving at least a molecular layer of undiffused zirconium silicon alloy on the surface of the body. This heating treatment produces a metallurgical bond between the zirconium silicon and the boron nitride containing body without the use of any interface material and is achieved primarily by a diffusion of a portion of the zirconium silicon into the boron nitride containing body.

The resultant zirconium-silicone alloy coated boron nitride containing vessel is admirably suited for use as an evaporation boat for molten metals, such as aluminum, in conventional vacuum metallizing systems.

The boron nitride containing vessel can be composed of between about 20 and about 80 weight per cent boron nitride with the remainder being a compatible refractory material. In vapor deposition applications where the conductivity of the vessel is important, a refractory material possessing electrically conductive characteristics is required so that when added to the boron nitride it will render the resultant material sufficiently conductive for use in such applications.

Various refractory materials can be successfully employed for use with boron nitride. For example, materials such as titanium diboride, zirconium diboride, and the like are well suited as the refractory material with titanium diboride being the preferred material. The foregoing list of refractory materials is for illustrative purposes and is not intended to unduly limit the scope of the invention.

DESCRIPTION OF THE DRAWING

The sole FIGURE shown in the drawing is an isometric illustration of a rectangular vessel or boat of the type commonly employed in a conventional vacuum metallizing apparatus.

Referring to the drawing, there is shown an isometric illustration of an evaporation boat 1 having a cavity 2 disposed on a portion of its longitudinal and lateral surface. The floor of the cavity 2 constitutes the evaporization surface of boat 1 and is coated with a zirconium silicon base alloy 4 which is chemically and mechanically bonded thereto. The evaporization boat 1 is formed of a boron nitride containing refractory material 3.

The preferred embodiment of the invention would comprise a zirconium silicon alloy bonded to a portion of the surface of a composite material comprising boron nitride and titanium diboride. Best results are obtained by using a zirconium silicon alloy having a zirconium content of between about 62 and about 86 weight per cent with the remainder essentially silicon.

The zirconium silicon alloy can be applied to the surface of a boron nitride containing vessel by any conventional technique, such as by coating the surface with a molten zirconium silicon alloy using flame spraying techniques, or by preparing a slurry of zirconium silicon particles, depositing the same on the surface of the vessel and then heating the vessel to a temperature sufficient to cause some of the alloy to diffuse into the boron nitride containing substrate to react therewith while leaving at least a molecular layer of the zirconium silicon on the surface of the vessel. When using the slurry technique, the coating of zirconium silicon particles should preferably be heated to a temperature just below the melting point of the alloy which is usually between about 1,700°C. and about 2,200°C. depending on the exact alloy composition employed. Heating the as-coated vessel to a temperature above the melting point of the alloy is also permissible but not as effective. Methods for forming a slurry of zirconium silicon particles are well known in the art and therefore will not be discussed in detail here.

One essential benefit derived from the use of the slurry technique for depositing the alloy onto the surface of a body is that irregular shaped bodies can be easily and economically coated thus extending the benefit attributed to this invention to various shaped objects.

The following example will serve to illustrate in detail the practice of the present invention.

EXAMPLE

A rectangular vessel, of the type shown in the drawing, 6 ½ inches long by 1 ½ inch in width by ½ inch in height and having a cavity therein measuring approximately 3 cubic inches was fabricated from a composite refractory material comprising 50 weight per cent boron nitride with the remainder being essentially titanium diboride.

A slurry of zirconium disilicide($ZRSI_2$) particles having an average particle size of between 3 and 6 microns was prepared by suspending a powdered 62 weight per cent zirconium, 38 weight per cent silicon alloy in a xylene slip system which contained 20 volume per cent cyclopentadiene as a deflocculant.

This slurry was applied to the floor of the cavity in the boron nitride containing vessel (i.e., to its evaporation surface) and bonded thereto by heating the vessel in inert gas (argon) to a temperature of 1,680°C. in about 4 hours. A hold time of about 5 minutes was employed at this temperature. The as-coated vessel was then cooled to ambient and removed from the furnace. This reaction at the high temperature produced a metallurgical bond between the zirconium disilicide ($ZRSI_2$) and the boron nitride containing vessel.

The vessel so prepared was then used as an aluminum evaporation vessel in a conventional evaporation apparatus. Under identical conditions, an uncoated boron nitride containing vessel was also used as an aluminum evaporation vessel in the same evaporation apparatus. The aluminum wet the coated cavity immediately while the uncoated cavity took 30 minutes before being completely wetted. The rate of evaporation of aluminum from the coated vessel was double the rate of aluminum evaporation from the uncoated vessel. This increase in evaporation rate was due primarily to the fact that aluminum readily and completely wetted the evaporation surface of the coated vessel while such was not the case with the uncoated vessel.

The term evaporation surface as used herein and in the appended claims is meant to describe the surface of the evaporation vessel which is wetted by the metal to be evaporated.

The foregoing example is for illustrative purposes and is intended to show one use for a zirconium silicon coated boron nitride containing vessel. In general, the coated vessel of this invention can find utility as vessels for containing molten metals, such as aluminum, in other metal handling processes.

What is claimed is:

1. A vessel comprising between at least 20 and about 80 weight per cent boron nitride with the remainder being a compatible refractory material, said vessel having at least a portion of its surface coated with a zirconium silicon alloy.

2. The vessel as in claim 1 wherein said refractory material is selected from the group consisting of titanium diboride, and zirconium diboride.

3. The vessel of claim 1 wherein said zirconium silicon alloy comprises from about 62 to about 86 weight per cent zirconium with the remainder being essentially silicon.

4. The vessel of claim 2 wherein said zirconium silicon alloy comprises from about 62 to about 86 weight per cent zirconium with the remainder being essentially silicon.

5. The vessel of claim 1 for use in the evaporization of molten metals wherein said vessel has a cavity in which at least a portion of the evaporization surface of said cavity is coated with a zirconium silicon alloy bonded thereto for providing a surface which is readily wetted by said molten metal.

6. The vessel of claim 5 wherein said refractory material is selected from the group consisting of titanium diboride, and zirconium diboride; and wherein said molten metal is selected from a group consisting of aluminum, silver and gold.

7. The vessel of claim 5 wherein said zirconium silicon alloy comprises from about 62 to about 86 weight per cent zirconium with the remainder being essentially silicon.

8. The vessel of claim 6 wherein said zirconium silicon alloy comprises from about 62 to about 86 weight per cent zirconium with the remainder being essentially silicon.

9. The vessel of claim 5 wherein said vessel consists essentially to 50 weight per cent boron nitride with the remainder being titanium diboride and wherein said evaporation surface is coated with an alloy consisting of 62 weight per cent zirconium and 38 weight per cent silicon.

10. The vessel of claim 5 wherein said vessel is rectangularly shaped and has a cavity disposed on a portion of its longitudinal and lateral surface which extends into said vessel for a portion of its depth.

\* \* \* \* \*